United States Patent
Stine et al.

(10) Patent No.: US 6,629,111 B1
(45) Date of Patent: Sep. 30, 2003

(54) MEMORY ALLOCATION SYSTEM

(75) Inventors: Arthur B. Stine, Sunnyvale, CA (US); Pradeep K. Kathail, Sunnyvale, CA (US); Stephen P. Belair, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/418,045

(22) Filed: Oct. 13, 1999

(51) Int. Cl.$^7$ .............................................. G06F 12/00
(52) U.S. Cl. ...................... 707/205; 711/171; 711/203
(58) Field of Search ................................ 711/171, 203, 711/207, 208, 209; 707/205

(56) References Cited

U.S. PATENT DOCUMENTS

| | | | | |
|---|---|---|---|---|
| 5,426,747 A | * | 6/1995 | Weinreb et al. | 711/203 |
| 5,561,786 A | * | 10/1996 | Morse | 707/205 |
| 5,784,699 A | * | 7/1998 | McMahon et al. | 711/170 |
| 5,890,189 A | * | 3/1999 | Nozue et al. | 709/100 |

OTHER PUBLICATIONS

"Microsoft Press Computer Dictionary Second Edition", Microsoft Press, 1994; p. 236.*
Andrew S. Tanenbaum, "Modern Operating Systems", Prentice Hall 1992, pp. 74–90 and 128–141.*

* cited by examiner

Primary Examiner—Reginald G. Bragdon
(74) Attorney, Agent, or Firm—Beyer Weaver & Thomas LLP

(57) ABSTRACT

A method of allocating memory for a file includes determining a size of the file and searching a memory segment list to determine whether the file can be stored in one of a plurality of memory segments catalogued in the memory segment list. The memory segment list includes a plurality of entries, each one of the plurality of entries being associated with one of the plurality of memory segments and indicating whether the associated one of the plurality of memory segments includes a hole that is unoccupied, where each of the corresponding ones of the plurality of entries are adapted for identifying the hole and a hole size associated with the hole that identifies an amount of memory within the memory segment that is unoccupied.

45 Claims, 10 Drawing Sheets

MEMORY ALLOCATION SYSTEM

FIELD OF THE INVENTION

The present invention relates generally to memory allocation. More particularly, the present invention relates to methods and apparatus for allocating portions of pages, thereby conserving physical memory and virtual memory.

BACKGROUND OF THE INVENTION

Computer software designers and programmers often find it desirable to re-use modules of code or data within multiple applications, Moreover, there are a variety of circumstances in which it is desirable to share code, text, or data among multiple processes. A segment of memory that stores this shared code, text, or data is typically referred to as a shared memory segment. When memory is allocated, the memory is associated with a physical address. However, when an application accessing a shared memory segment is running on a virtual memory system, the CPU accesses a virtual address associated with the shared memory segment rather than a physical address.

Virtual address space in virtual memory is associated with an address range that is typically much larger than that of physical memory. The virtual memory address range starts at a base address and ends at an upper boundary address. This virtual memory address range is divided into pages, which may correspond during the execution of an application to various physical addresses. In other words, the same virtual address may be mapped to many different physical addresses over time. In this manner, virtual memory allows for very effective multiprogramming and relieves the user of unnecessarily tight constraints of main memory.

FIG. 1A is a diagram illustrating a prior art implementation of a conventional virtual memory system. During runtime, a shared memory segment is accessed by its virtual address. More particularly, CPU 102 generates a virtual address which is converted to a physical address using a translation look-aside buffer (TLB) 104. More particularly, the virtual page number is mapped by a memory management module 105 to a physical page number using the TLB 104. Thus, the TLB 104 is maintained to translate virtual addresses to physical addresses. In a typical virtual memory system, memory is allocated in units of pages. Thus, each entry 106 in the TLB is required by hardware to correspond to a page. In addition, the number of entries in the TLB is restricted by hardware. For instance, the maximum number of entries in a TLB may be 96.

During the execution of an application 108, the application may access code 110, text 112, and/or data 114 that are grouped within a library 116. Each shared memory segment containing an accessed portion of the library 116 is loaded and stored in one or more pages in physical memory. Once loaded, each page is accessed by a virtual address via a corresponding entry in the TLB 104.

In order to retrieve data from memory, the virtual-to-physical address translation is performed via the TLB 104. As shown in FIG. 1B, each entry 106 in the TLB 104 typically associates a virtual address 118 of a page in virtual memory with a corresponding physical address 120 of a page in physical memory. In addition, a page size 122 may be optionally provided. Moreover, attributes 124 associated with the page are typically specified. For instance, attributes of the page may include caching attributes (e.g., cached, uncached) as well as indicate whether a page can be read, written, and/or executed (e.g., read/write, read/execute, read/write/execute, read only).

A page table (not shown to simplify illustration) is used to translate a virtual address, consisting of a page number and offset, into a physical address, consisting of a frame number and offset. The page number of a virtual address is used to index the page table. Each entry in the TLB 104 represents a page table entry that has been most recently used and, thus, comprises a subset of the complete page table.

When all entries in the TLB have been used and a new entry in the TLB is needed, an existing entry is overwritten and allocated for use as the new entry. As a result, when the overwritten entry cannot be accessed by the associated virtual address, a TLB miss results. The TLB miss generates a trap, which interrupts execution of the calling application until the application is resumed. The virtual-to-physical mapping associated with the needed page is then loaded into the TLB. Thus, the TLB entry for that page is updated or created. Due to the limited capacity of a TLB, it is therefore typically necessary to limit the number of libraries that are simultaneously accessed to reduce the occurrence of TLB cache misses.

In addition to the limited size of the TLB, the size of a page is architecture specific. In the past, these page sizes were relatively small (e.g., on the order of 512 bytes). However, in newer systems, the page sizes are typically much larger. For instance, page sizes may range from 4K to 16M. Since the TLB requires that virtual addresses be mapped to physical addresses in units of pages, the memory for the new memory segment must also be allocated in units of pages. In other words, it is not possible to allocate a portion of a page. Thus, while the allocation of memory in units of pages makes the task of memory page management more scalable for very large memory systems, this also tends to contribute to wasted memory when an object (e.g., library portion, code, data, text) stored in memory occupies much less than a single page or only a small portion of one of the pages allocated for its storage. This is particularly problematic in embedded systems, where memory resources are limited, as will be shown and described with reference to FIG. 2.

FIG. 2 is a diagram illustrating the allocation of memory when a library is loaded according to conventional methods. As shown, a memory 202 stores a first application 204 and a second application 206. During execution, the first application 204 accesses a first library 208 such as a dynamically loaded library (DLL), "LIBINFRA", and the second application 206 accesses a second library 210, "LIBC". When the first library 208 is loaded into memory, a new page 212 is allocated. Even where the first library 208 requires only a small portion 214 of the newly allocated page 212, the entire page is allocated and dedicated in its entirety to the first library 208. Similarly, when the second library 210 is loaded into the memory 202, a second page 216 is allocated, even where the second library 210 occupies only a small portion 218 of the second page 216. As one example, a library may occupy only 128 bytes of a 4K page. Due to the limitations of current memory allocation schemes, the remaining memory within this page would remain unused. As another example, a library may occupy 3.05 pages. Since 4 pages must be allocated according to current memory allocation schemes, almost an entire page is wasted. Thus, allocation of memory for shared memory segments (e.g., libraries) according to conventional systems results in the wasting of a substantial amount of memory. As shown, this unnecessary memory consumption is particularly problematic where the page sizes are much larger than the libraries being stored in memory.

In view of the above, it would be desirable to optimize the use of available memory in a system such as an embedded system. Moreover, it would be beneficial if the probability of a cache miss could be reduced without limiting the simultaneous access of multiple libraries, therefore maximizing the number of shared memory segments that can be simultaneously accessed.

SUMMARY OF THE INVENTION

An invention is described herein that provides methods and apparatus for allocating memory. According to one embodiment, this is accomplished, in part, through the use of a memory manager that accesses a memory segment list of a plurality of memory segments. The memory segment list and memory manager are designed so that regions of allocated memory pages that might normally go unused may actually be used to store data or other information. In this manner, physical memory is conserved during the allocation process. Moreover, virtual memory is conserved by a client (e.g., computer or application) running an application that accesses one or more of the plurality of memory segments.

According to one aspect of the invention, a memory manager is adapted to update a memory segment list such that it includes a plurality of entries, where each of the entries are associated with one of a plurality of memory segments. Upon allocation of a new memory segment, the new memory segment includes one or more pages. However, throughout the process, unused portions of the memory segments may be used such that each resulting memory segment identified in an entry may include a fractional number of pages. In addition, each of the entries is capable of identifying a hole in the associated memory segment as well as a hole size associated with the hole that identifies an amount of memory within the memory segment that is unoccupied. Moreover, the memory manager is preferably capable of updating the memory segment list so that the entries identify one or more attributes associated with the corresponding memory segment.

According to another aspect, the memory manager is adapted for searching the memory segment list to determine whether information (e.g., a file) can be stored in one of the plurality of memory segments that are catalogued in the memory segment list. This is accomplished through comparing the size of the file as well as the attributes of the file with the hole size and attributes of a particular memory segment identified in the memory segment list. If the hole size is at least as large as the size of the file and the attributes of the file are compatible with those of the memory segment, the file is stored in the hole in the memory segment and the memory segment list is updated accordingly. Otherwise, a new memory segment is allocated from physical memory, the file is stored in this new memory segment, and the memory segment list is updated to include information associated with the file as well as the new memory segment. In addition, it is preferable if an address (e.g., virtual address) is stored in the associated entry so that this address may be provided to a calling application.

According to another aspect of the invention, a memory segment list is used to catalogue a plurality of memory segments. Each entry in the memory segment list may be used to track a particular memory segment that has been allocated and therefore may store a variety of information associated with the memory segment, such as the starting virtual address and attributes of the memory segment. Moreover, once mapped to a particular file, the entry may store information associated with that particular file, such as the name of the file, the size of the file, and the hole size defining an unallocated portion of the memory segment once the file has been stored in the memory segment. The entries may be created statically. Alternatively, the entries may created dynamically when the memory segments are allocated or mapped to a particular file that has been stored in the memory segment.

Through the use of the present invention, physical memory as well as virtual memory may be conserved in a system utilizing a virtual memory system. Memory must typically be allocated in units of pages. However, the present invention effectively utilizes portions of pages designated as "holes", thereby effectively allocating the segments of physical memory with a finer granularity. In other words, memory need not be allocated on page boundaries. As a result, the number of pages represented in a TLB and therefore the corresponding number of pages required in virtual memory are minimized. Moreover, when a hole in a memory segment already containing data is used, a new TLB entry need not be created since the hole is mapped in an entry in the memory segment list. Since the number of entries required in a TLB are conserved, the probability of a TLB cache miss is reduced. Accordingly, the present invention facilitates the utilization of memory, particularly in an environment where the page sizes are typically much larger than the objects being stored in memory.

DETAILED DESCRIPTION OF THE PREFERRED EMBODIMENTS

Figure 1A:
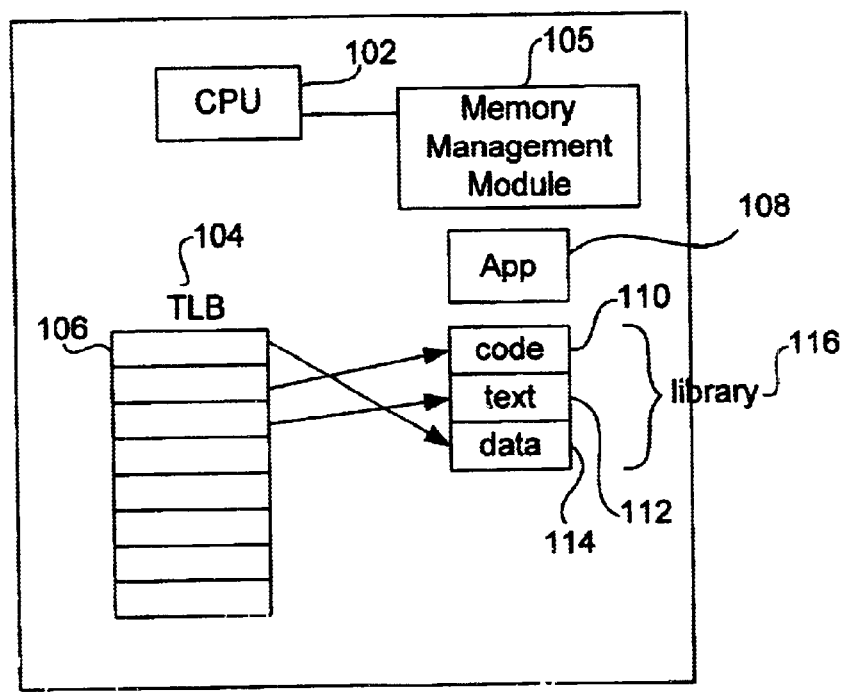
FIG. 1A is a prior art diagram illustrating an implementation of a conventional virtual memory system.

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention provides a memory allocation scheme which may be used to conserve memory that is to be accessed by one or more clients (e.g., computers or applications). More particularly, the following description refers to the loading of dynamically loaded libraries (DLLs) to enable code, text, and data to be shared among multiple clients. However, the present invention is equally applicable to the allocation of memory for the storage of files used for other purposes.

When a segment (e.g., text, data, code) within a library is called by a running application in a system having a typical virtual memory system, the library segment is typically loaded into virtual memory and run. However, the hardware in presently available virtual memory systems restricts the mapping between physical addresses and virtual addresses to those existing on page boundaries. The present invention may be applied to maximize the use of each page in physical memory that is allocated while minimizing the amount of virtual memory required by a client accessing the library.

According to one aspect of the invention, when the DLL is loaded, the DLL is preferably loaded into a memory segment containing one or more previously loaded DLLs rather than allocating a new memory segment. This allocation process is accomplished by a memory manager (i.e., DLL manager) which determines whether the existing memory segment contains an unused portion that is suitable for storing the DLL. Once the DLL is loaded, a corresponding virtual address is associated with the loaded DLL to enable a calling application to access the DLL. Accordingly, since DLLs are loaded into existing memory segments already containing data, fewer pages in memory are allocated.

According to another aspect of the invention, the memory manager maintains a list of DLLs that are loaded into memory and searches this list for a "hole" in a memory segment that has previously been mapped to a previously loaded DLL. Once the size and attributes (e.g., read, read/write) of the current DLL are determined, the DLL manager searches for a hole having the same size and attributes. If the hole having an adequate size and attributes is found, then the current DLL is loaded into the hole and a new entry is created in the list of DLLs for the current DLL. More particularly, the new entry is associated with the next available virtual address. The hole size of the prior "hole owner" is set to zero and the entry of the recently loaded DLL as the new "hole owner" indicates the amount of memory that remains in the mapped memory segment. The virtual address may then be returned for use by a client running the application within the DLL. Accordingly, multiple processes sharing the DLL may access the DLL at this returned virtual address.

The present invention provides several advantages since it conserves physical memory and virtual memory. More particularly, physical memory is conserved since the size of memory required by multiple programs or other resources that are loaded into memory is minimized. Since the number of pages required in physical memory is reduced, the number of entries that are used in the TLB is also reduced. It is important to note that since the number of entries in the TLB required to map virtual addresses to physical addresses is reduced, it is possible to use multiple DLLs simultaneously without risking a miss in the TLB during runtime. As a result, the present invention results in better TLB performance and therefore increases efficiency during real-time execution of a calling application. Accordingly, memory consumed for each DLL is minimized, which is particularly important in embedded systems.

In addition to conserving physical memory, the present invention enables virtual memory to be conserved in the client's available memory when the client runs the application. As previously described, it is impossible with currently existing technology to map smaller than a page size. However, through the use of the present invention, fewer entries are required in the TLB. It follows that since fewer entries are stored in the TLB, fewer pages will be mapped into the client's virtual address space. Thus, when the application is run by the client accessing the loaded DLL library, since the number of virtual memory pages are minimized, fewer pages will be required to store the application when it is run by the client.

Figure 1B:
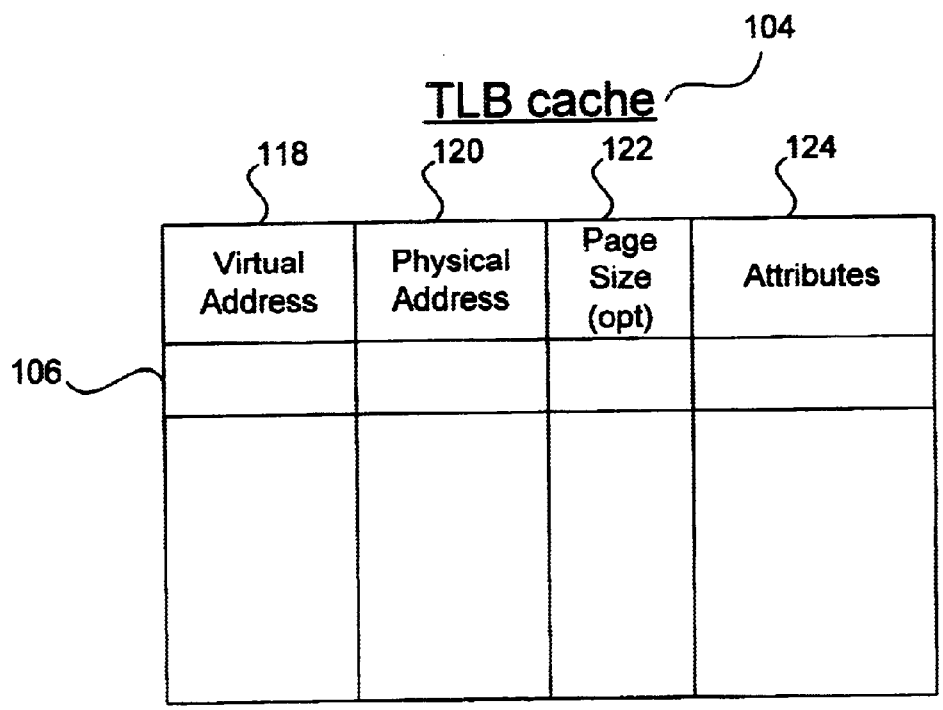
FIG. 1B is a diagram illustrating a TLB which may be implemented in a virtual memory system to map virtual addresses to physical addresses.
Figure 2:
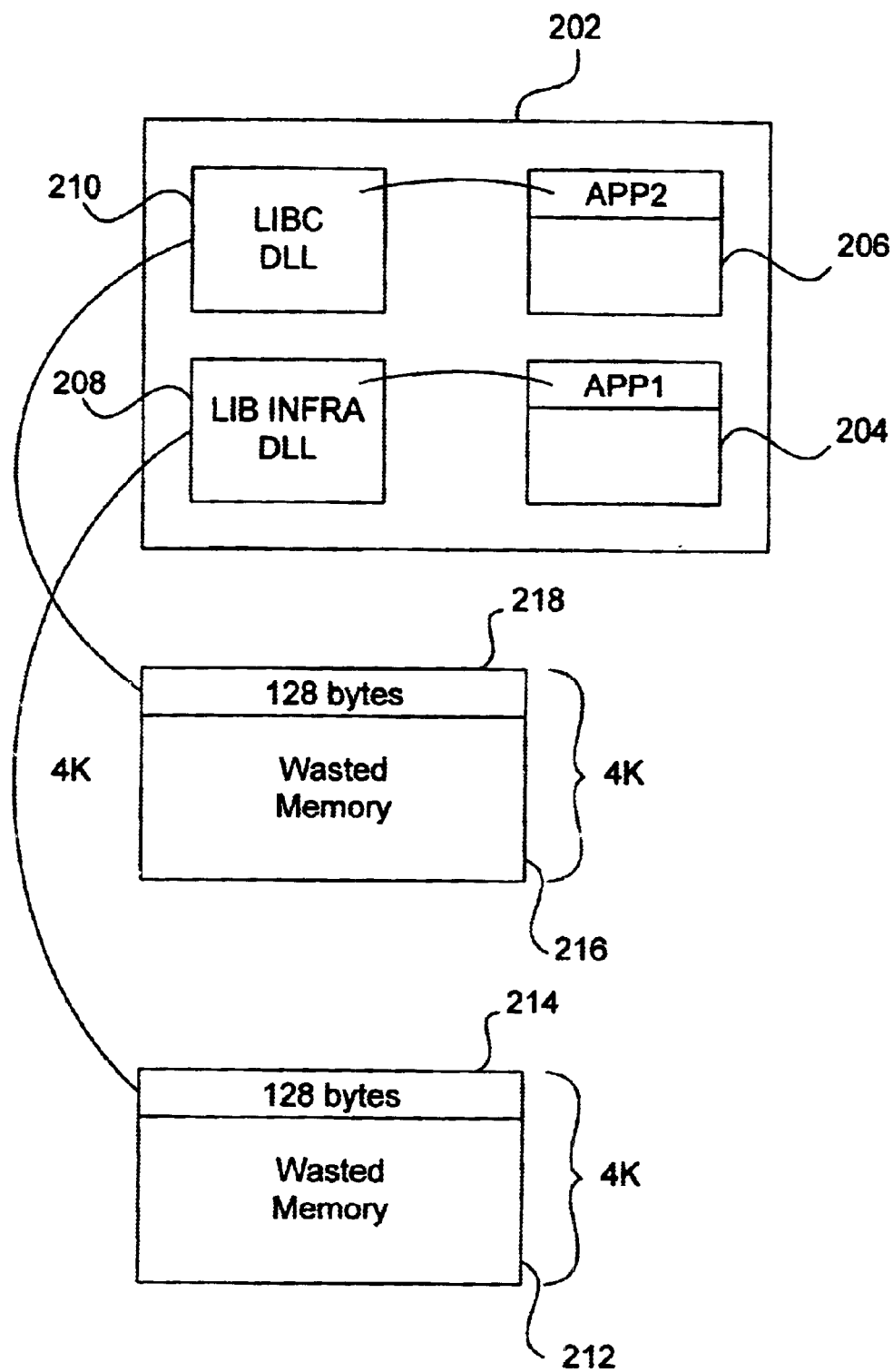
FIG. 2 is a diagram illustrating the allocation of memory when a library is loaded according to conventional methods.
Figure 3A:
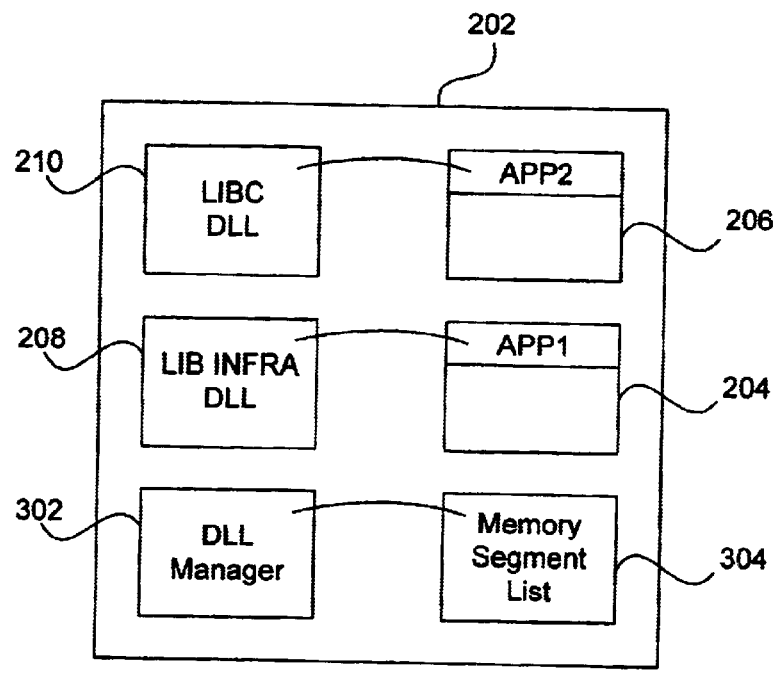
FIG. 3A is a diagram illustrating a memory allocation system according to one embodiment of the invention.

Referring now to FIG. 3A, a memory allocation system according to one embodiment of the invention is illustrated. As previously described with reference to FIG. 2, a substantial amount of memory is wasted when the libraries 208 and 210 are loaded into memory. In order to alleviate this problem, the present invention serves as a secondary memory allocation scheme that is used in conjunction with a system such as that shown and described with reference to FIG. 1A and FIG. 1B. More particularly, the present invention comprises a DLL manager, hereinafter referred to as a memory manager 302, and a memory segment list 304. The memory manager 302 manages the allocation of memory and is responsible for updating the memory segment list 304. One method of implementing the memory manager 302 will be shown and described in further detail below with reference to FIGS. 5–10.

Figure 3B:
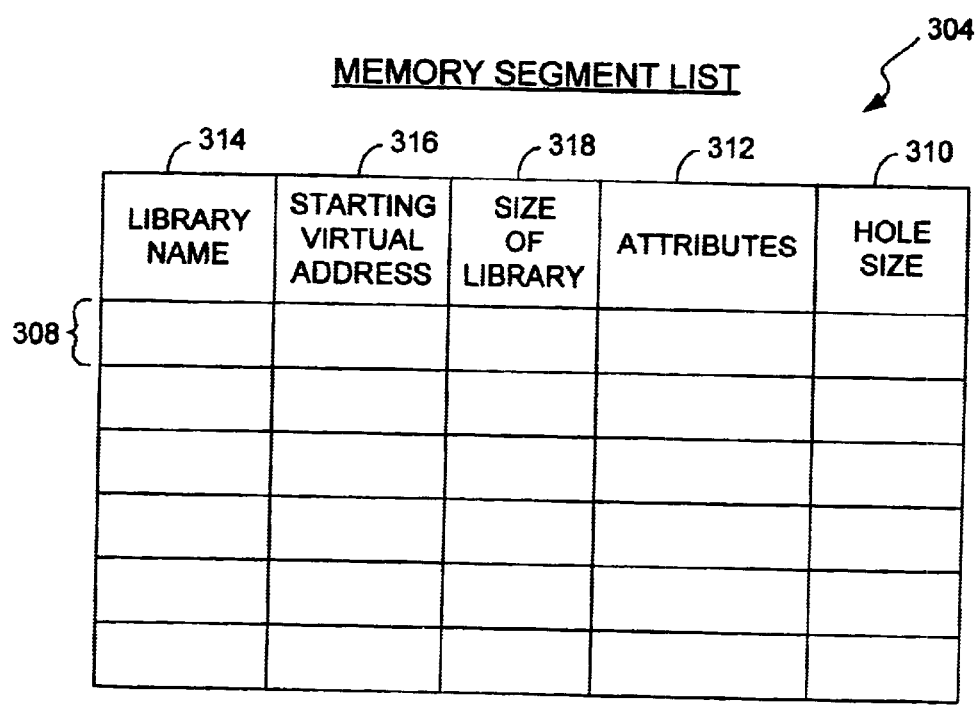
FIG. 3B is a diagram illustrating the memory segment list of FIG. 3A according to one embodiment of the invention.

One implementation of the memory segment list of FIG. 3A is presented in FIG. 3B. A memory segment list 304 includes a plurality of entries such as entry 308. Each one of the plurality of entries is associated with one of a plurality of memory segments. Moreover, each one of the plurality of entries 308 indicates whether the associated one of the plurality of memory segments includes a hole that is unoccupied and is adapted for identifying the hole and a hole size 310 associated with the hole that identifies an amount of memory within the memory segment that is unoccupied. Each one of the plurality of entries may further identify one or more attributes 312 associated with the corresponding memory segment. When a DLL, library, or other file is stored in a memory segment, the associated entry 308 may store a file identifier 314 (e.g., library name), a starting address 316 (e.g., starting virtual address) of the memory segment (and therefore the address at which the file is located), and a size identifier 318 identifying the size of the library. Thus, the hole size 310 associated with each of the memory segments may be non-zero or zero to indicate whether any memory remains within the memory segment that can be used by another library. The memory segment list 304 may be implemented in a linked list, array, or other suitable data structure.

In the following description, entries in the memory segment list correspond to memory segments that have been allocated and mapped to at least one library. More particularly, a single entry is created for each library. Thus, a new entry is added each time a memory segment is allocated and mapped to a library. However, the memory segment list may be implemented in other ways. As one example, the memory segment list as well as associated memory segments may be allocated statically so that the list includes information identifying those memory segments that have been mapped to libraries as well as those that have not been mapped. Thus, each statically allocated memory segment may be mapped to one or more libraries. In other words, once "holes" are mapped to libraries stored in these holes, one or more entries in the memory segment list corresponding to the previously (e.g., statically) allocated memory segment are mapped to one or more libraries.

Figure 4:
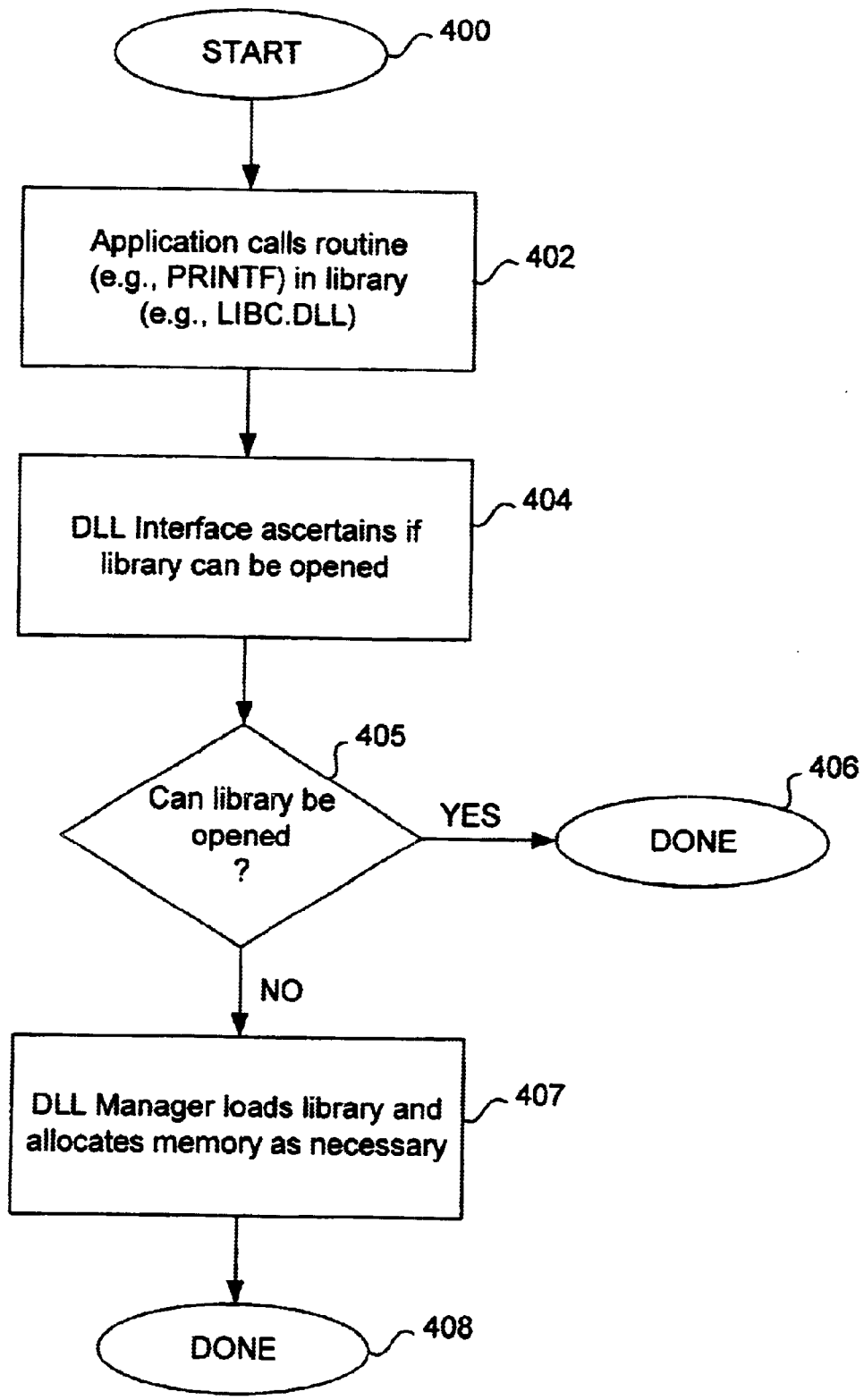
FIG. 4 is a process flow diagram illustrating one method of running an application according to an embodiment of the invention.

When an application accesses a library during execution of the application, the library is loaded into memory. FIG. 4 is a process flow diagram illustrating one method of running an application according to an embodiment of the invention. The process begins at block 400. When an application calls a routine provided in a specific library (e.g., LIBC.DLL) as shown at block 402, it is determined whether the application can open the library at block 404. More particularly, a specialized DLL interface (i.e., stub) is generated which ascertains if the library can be opened. If it is determined at block 405 that the library can be opened, the process ends at block 406. Otherwise, the memory manager loads the library and allocates memory as necessary at block 407 and the process ends at block 408. At this point, the application can make use of the loaded library.

As described above, the memory manager loads the library into memory and allocates memory as necessary. One method of implementing the memory manager to load the library and allocate memory as shown at block 407 of FIG. 4 is presented in FIG. 5. If it is determined at block 500 that the library has already been loaded by the memory manager (e.g., for another process), the memory manager finds the library in its memory segment list and a load address (e.g., a virtual address) at which the library has been loaded is returned at block 501. The virtual address may then be mapped to a physical address via the TLB. However, if the library has not been loaded, the memory manager loads the library into memory and therefore allocates memory as necessary as described at blocks 502 through 508. The memory manager allocates a new memory segment only when the library cannot be loaded into an existing memory segment. According to one embodiment, the library is loaded into an existing memory segment when the library fits in the hole in the existing memory segment and the attributes of the library are compatible with those of the existing memory segment. Thus, the size of the library is determined at block 502. Next, attributes of the library are obtained at block 504. The memory segment list is then searched at block 506 to determine whether the library can be stored in one of a plurality of memory segments catalogued in the memory segment list. One method of searching the memory segment list will be described in further detail below with reference to FIG. 6. The library is then stored in a hole in an existing memory segment or in a newly allocated memory segment, and the memory segment list is updated at block 508 to associate the library with a corresponding entry in the memory segment list. One method of updating the memory segment list will be described in further detail below with reference to FIG. 7. The load address is then returned at block 510. For instance, a virtual address associated with the library may be returned. The virtual address is then mapped to a physical address via the TLB.

In order to determine whether new memory needs to be allocated for the library, the memory segment list is first searched to determine whether the file can be stored in a "hole" in one of the memory segments catalogued in the memory segment list. According to one embodiment, the size of the hole must be large enough to accommodate the file and the attributes of the memory segment must be compatible with those of the file. For instance, attributes may indicate the ability to read, write, or execute contents of the memory segment. As another example, caching attributes such as those indicating that the contents of the memory segment are to be cached or uncached may be specified to define a caching policy.

Figure 5:
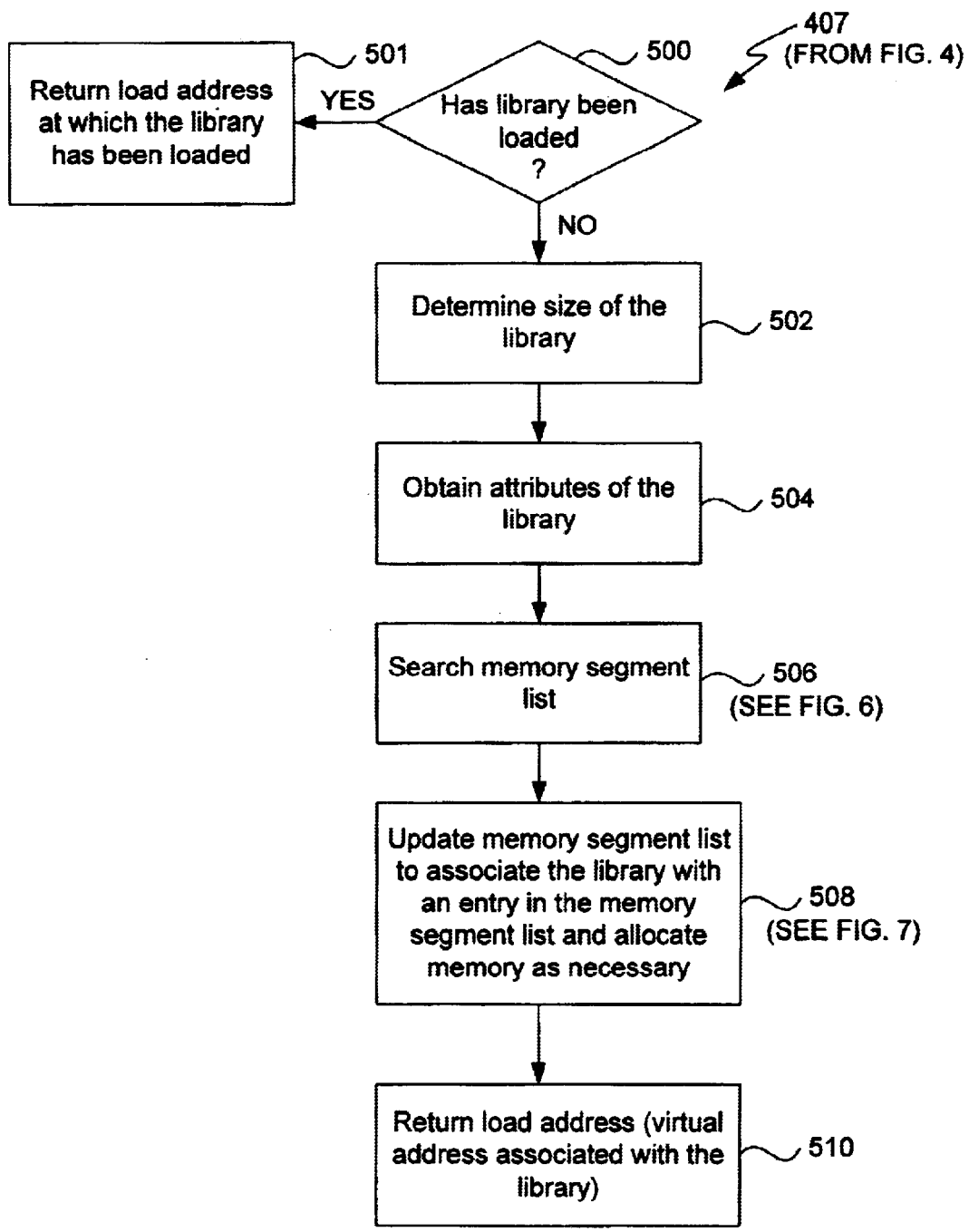
FIG. 5 is a process flow diagram illustrating one method of allocating memory as shown at block 406 of FIG. 4 according to one embodiment of the invention.
Figure 6:
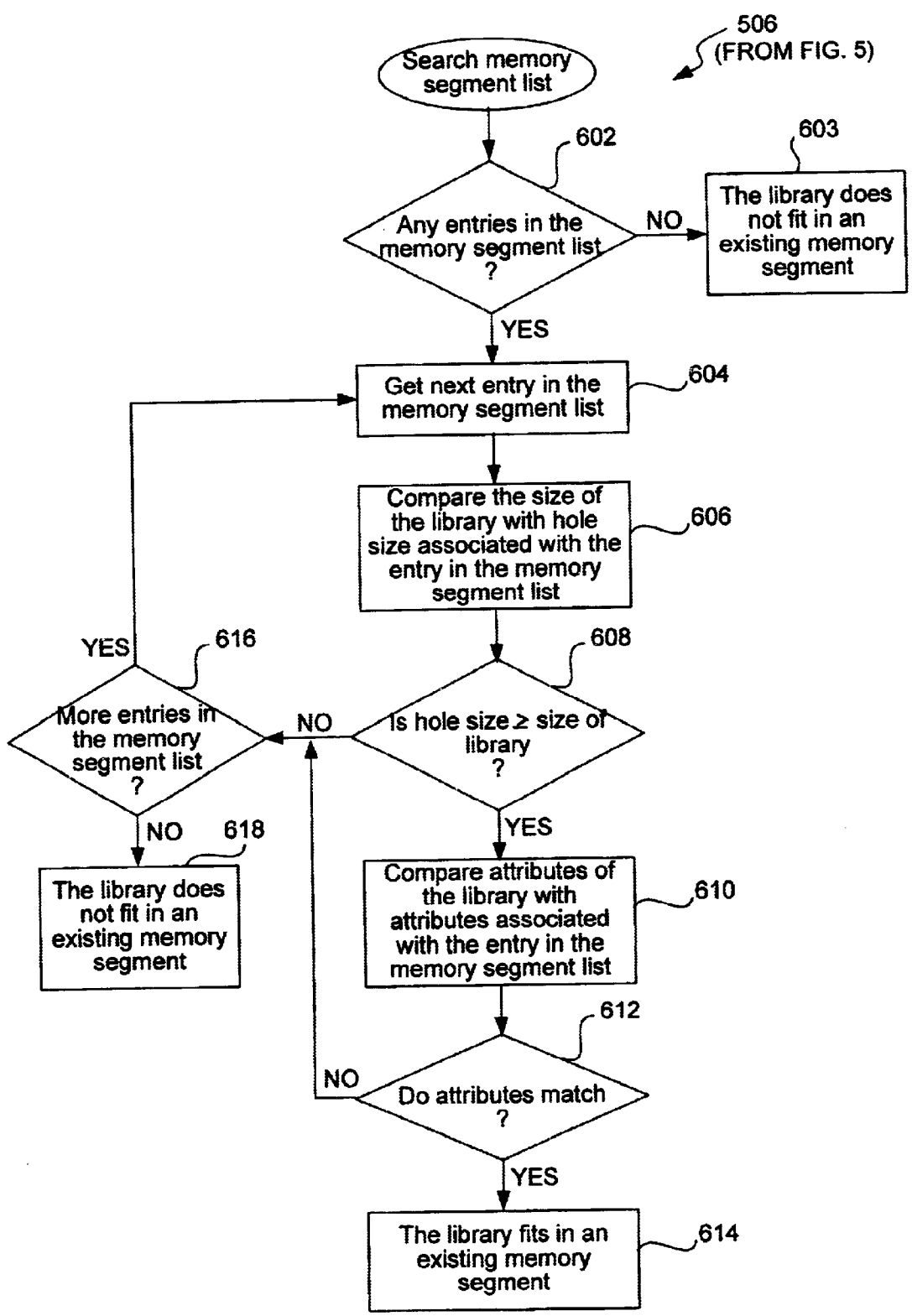
FIG. 6 is a process flow diagram illustrating one method of searching a memory segment list such as that shown in FIG. 3B as shown at block 506 of FIG. 5.

FIG. 6 is a flow diagram illustrating one method of searching the memory segment list as shown at block 506 of FIG. 5. At block 602 it is determined whether there are any entries in the memory segment list that have not been searched. If there are no entries in the memory segment list, it is determined at block 603 that the library does not fit in an existing memory segment. If there are entries in the memory segment list that have not been checked for available space, the next entry in the memory segment list is obtained at block 604. The size of the library is then compared with the hole size associated with the entry in the memory segment list at block 606. If it is determined at block 608 that the hole size is greater than or equal to the size of the library, the attributes of the library are compared at block 610 with the attributes associated with the entry in the memory segment list. If it is determined at block 612 that the attributes of the library are compatible with those of the entry in the memory segment list, the memory manager concludes that the library fits in an existing memory segment at block 614. For instance, when the attributes of the library are identical to those associated with the memory segment, the attributes are compatible.

If it is determined at block 608 that the size of the hole in the memory segment associated with the entry is not at least as large as the size of the file or it is determined at block 612 that the attributes of the memory segment that are identified in the entry are not compatible with those of the file, the process continues at block 616. If it is determined at block 616 that there are more entries in the memory segment list, the process continues at block 604 for the next entry in the memory segment list. However, if at block 616 it is determined that there are no more entries in the memory segment list, the memory manager concludes that the library does not fit in an existing memory segment at block 618.

Figure 7:
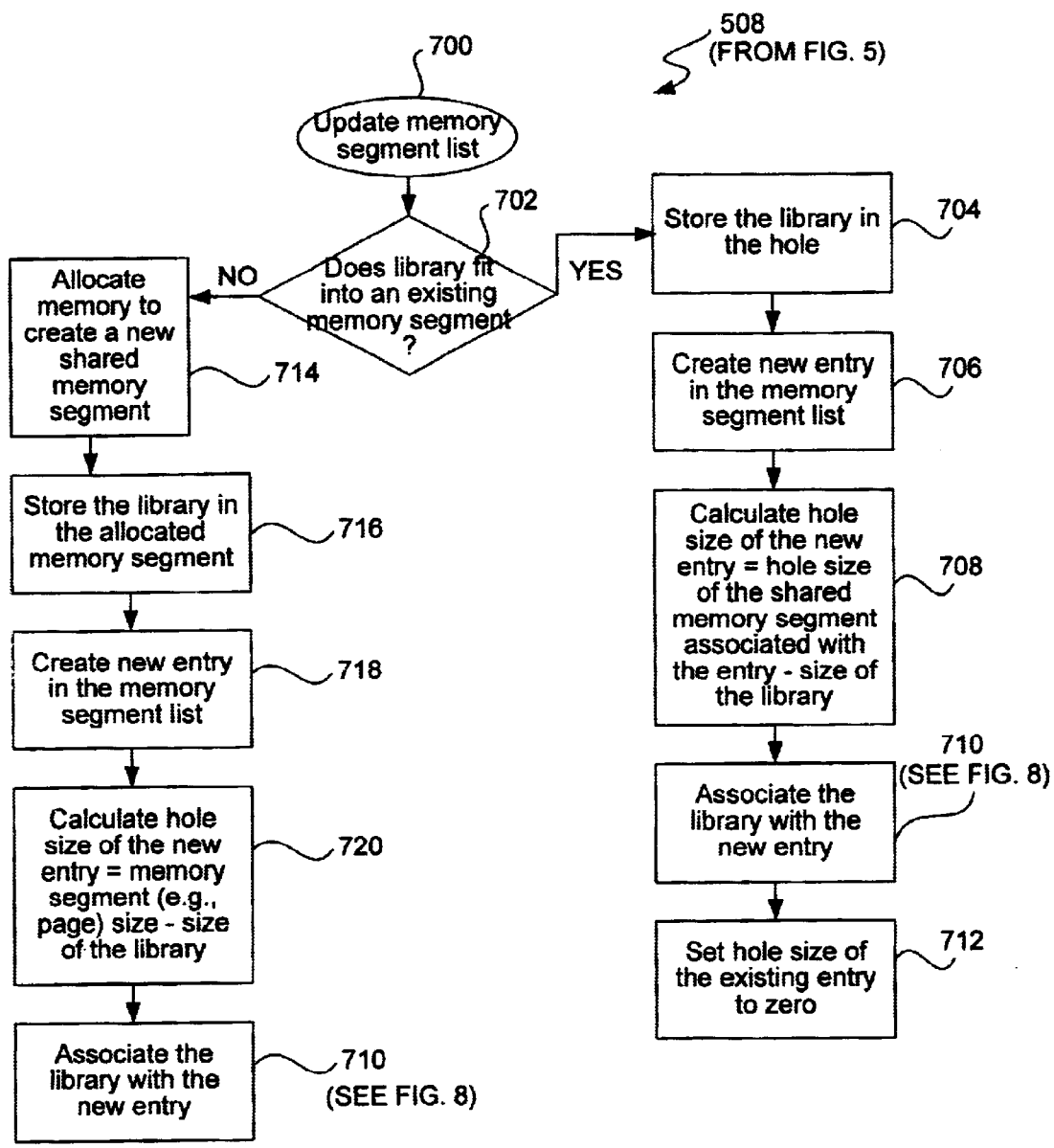
FIG. 7 is a process flow diagram illustrating one method of updating the memory segment list as shown at block 508 of FIG. 5.

Once it is determined whether the file can be stored in a previously allocated memory segment, the file can be stored and the memory segment list can be updated accordingly. FIG. 7 is a process flow diagram illustrating one method of updating the memory segment list as shown at block 508 of FIG. 5. The process begins at block 700. If the memory manager has determined that the library fits in an existing memory segment as shown at block 702, the library is stored in the hole at block 704 and the memory segment list is updated as shown at blocks 706–712. More particularly, a new entry is created in the memory segment list at block 706. The size of the hole for the new entry is calculated at block 708 to be the hole size of the shared memory segment associated with the previously allocated memory segment less the size of the library that is being stored in the hole of the current entry. The library is then associated with the new entry at block 710, which will be described in further detail with reference to FIG. 8. The hole size of the previous "hole owner" is then set to zero at block 712. Thus, any remaining hole is now reflected in the new entry.

If the memory manager has determined that the library does not fit in an existing memory segment which has been mapped to a previously loaded library, memory is allocated from physical memory to create a new memory segment at block 714. Since the TLB requires that virtual addresses be mapped to physical addresses in units of pages, the memory for the new memory segment is also allocated in units of pages. In other words, it is not possible to allocate a portion of a page. Thus, according to one embodiment, the memory segment size that is allocated is equal to the size in pages of the library being stored rounded up to a page boundary. The library is then stored in the newly allocated memory segment at block 716. A new entry is then created in the memory segment list at block 718. The hole size of the new entry is then determined at block 720 to be the size of the memory segment less the size of the library. As described above, the size of the memory segment is equal to one or more pages (or the equivalent bytes). The library is then associated with the new entry at block 710, which is described in further detail below with reference to FIG. 8.

As described above, regardless of whether the library can fit in an existing hole, the memory segment list is updated to reflect the loading of the library into memory. More particularly, the memory segment list is updated to indicate the location of the library once it is loaded into a newly allocated memory segment or in a hole in a previously allocated memory segment. According to one embodiment, the memory segment list is updated when a new entry is created to store information relating to the library and associated memory segment. In other words, information such as that illustrated in FIG. 3B is stored in an entry in the memory list.

Figure 8:
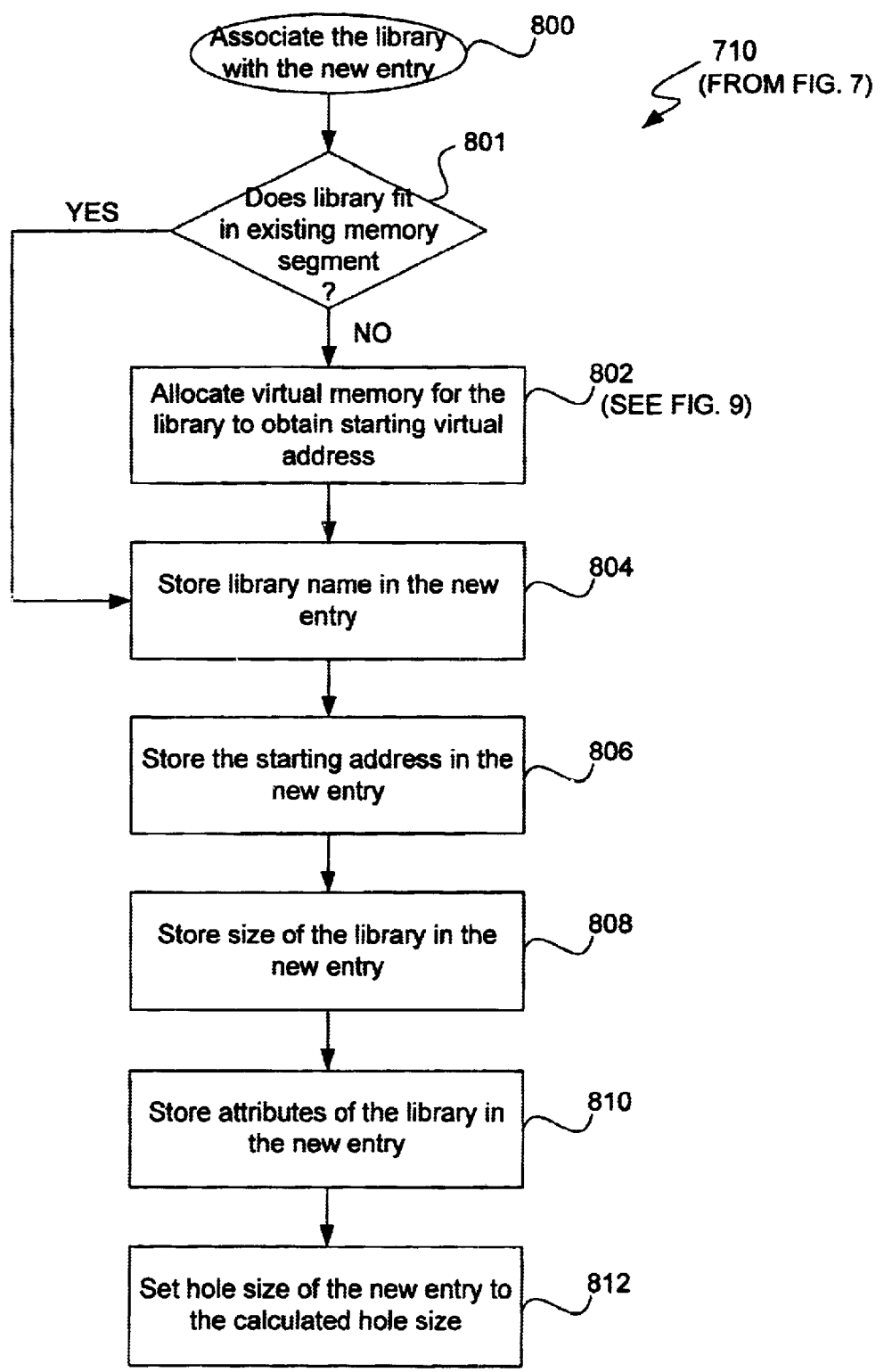
FIG. 8 is a process flow diagram illustrating one method of associating a library with a new entry in the memory segment list as shown at block 710 of FIG. 7.

FIG. 8 is a process flow diagram illustrating one method of associating a library with a new entry in the memory segment list as shown at block 710 of FIG. 7. The process begins at block 800. If it is determined at block 801 that the library does not fit in an existing memory segment, virtual memory for the library is allocated at block 802 to obtain a starting virtual address. More particularly, virtual memory is allocated in association with a newly allocated memory segment. Thus, the size of the virtual memory to be allocated is equal to the size of the physical memory that has previously been allocated as described above with reference to block 714 of FIG. 7. One method of allocating virtual memory will be described in further detail below with reference to FIG. 9. If it is determined at block 801 that the library fits in an existing memory segment (e.g., hole in an existing memory segment), virtual memory need not be allocated for the library. In other words, virtual memory need not be allocated for a hole.

Information is then stored in the entry, as illustrated in FIG. 3B. Thus, a library name associated with the library is stored in the new entry at block 804. The starting virtual address is then stored in the new entry at block 806. The size of the library is similarly stored in the new entry at block 808. In addition, the attributes of the library are stored in the new entry at block 810. In addition, the hole size of the new entry is set to the previously determined hole size at block 812. Thus, the new entry in the memory segment list illustrated in FIG. 3B stores all information associated with the library and associated memory segment.

Figure 9:
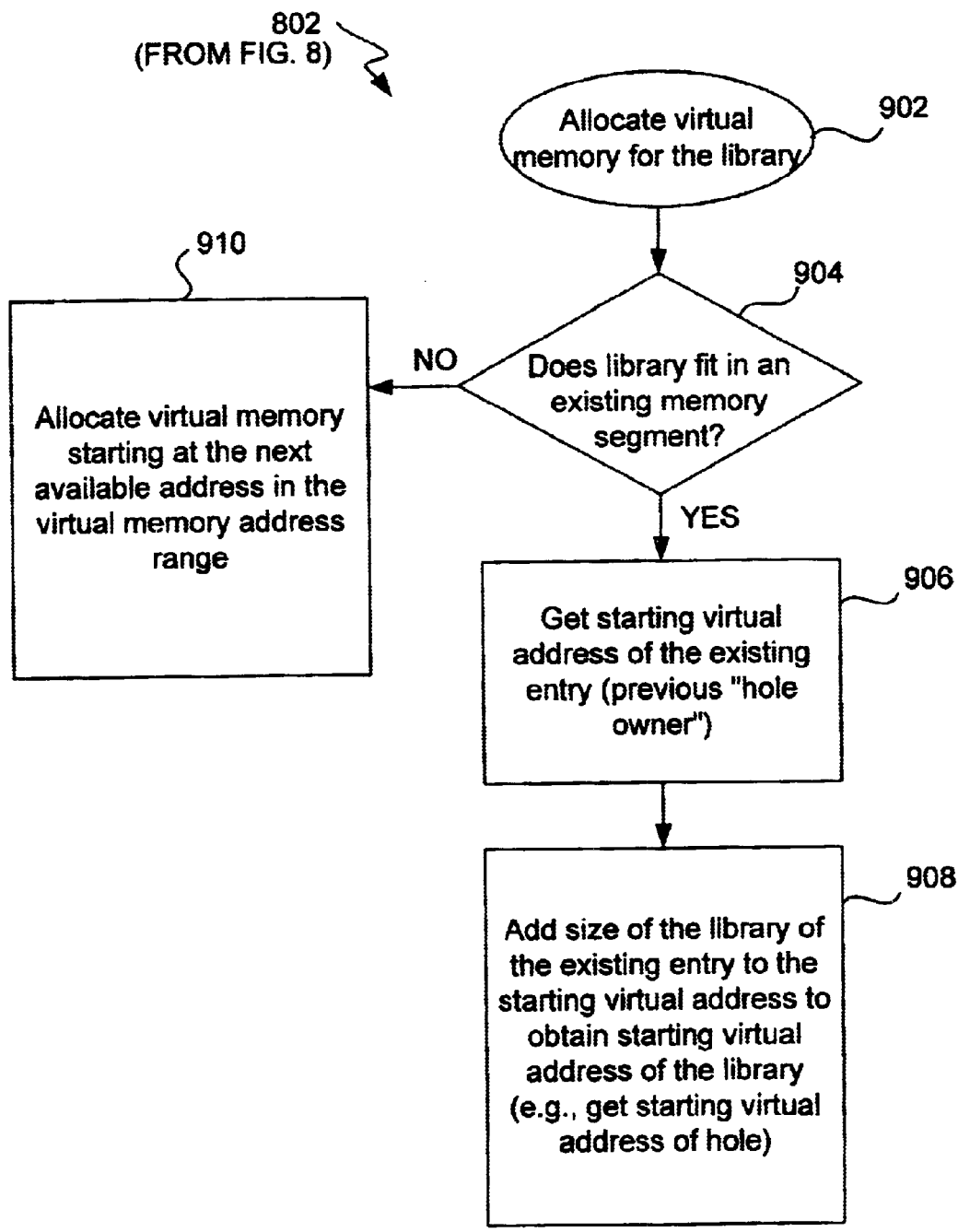
FIG. 9 is a process flow diagram illustrating one method of allocating virtual memory for the library as shown at block 802 of FIG. 8.

Since the CPU accesses a virtual address rather than a physical address, the memory manager stores the starting virtual address of the library in the appropriate entry in the memory segment list. FIG. 9 is a process flow diagram illustrating one method of allocating virtual memory for the library as shown at block 802 of FIG. 8. The process begins at block 902 and at block 904 if the memory manager has determined that the library fits in an existing memory segment, the starting virtual address of the existing entry (i.e., previous hole owner) is obtained at block 906. The size of the library of the existing entry is added to the starting virtual address of that library to obtain the starting virtual address of the library for which memory is being allocated (e.g., the starting virtual address of the hole) at block 908. If the library does not fit in an existing memory segment, virtual memory is allocated starting at the next available address in the virtual memory address range at block 910. For instance, the first entry in the memory segment list may be allocated from the base address of the virtual memory address range.

Figure 10:
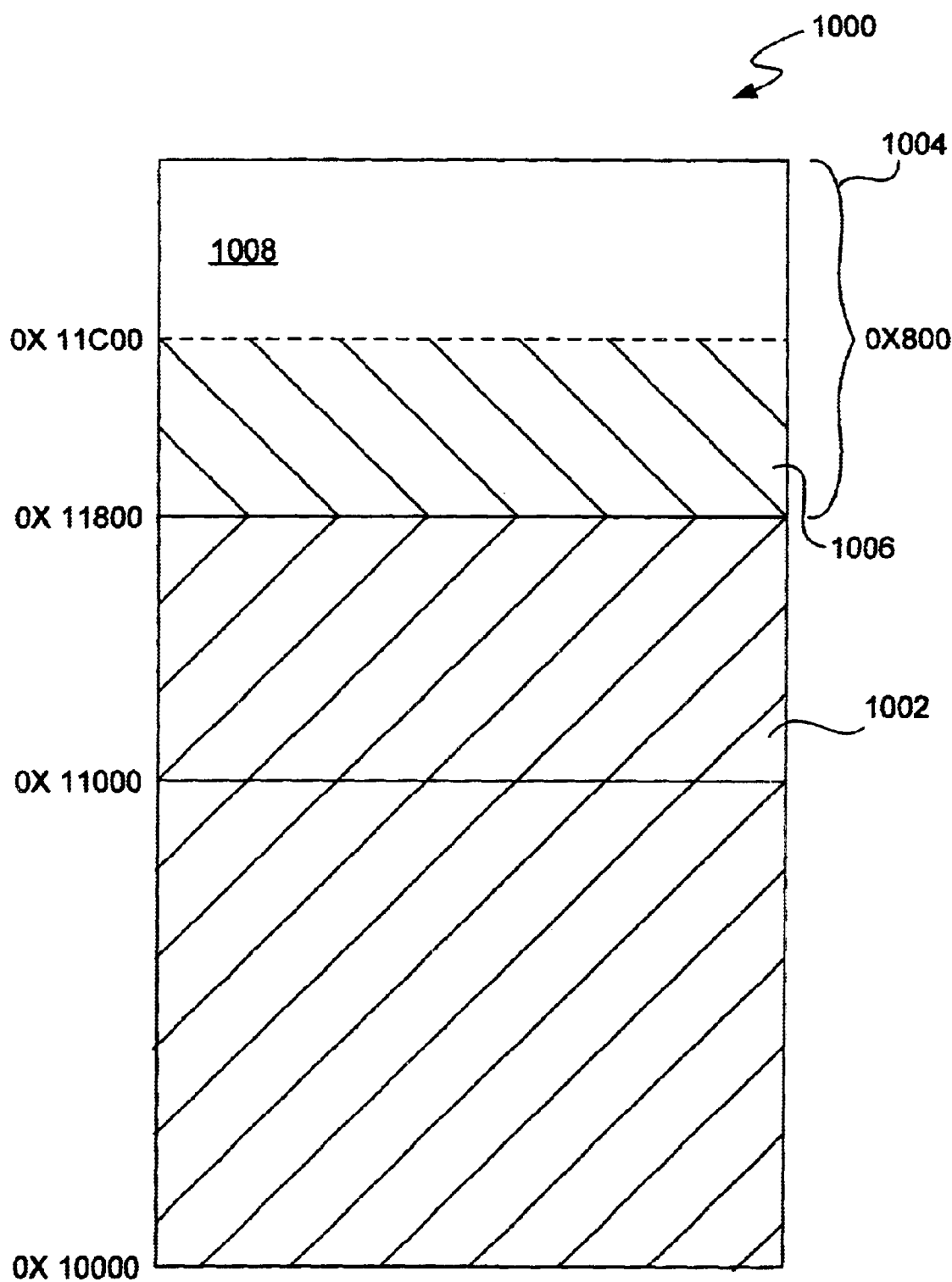
FIG. 10 is a diagram illustrating the allocation of memory when a library is loaded according to the present invention.

Through the use of the present invention, the consumption of physical memory and virtual memory is reduced. FIG. 10 is a diagram illustrating the allocation of memory when a library is loaded according to the present invention. In this example, a memory segment 1000 has previously been allocated to store a library 1002. As shown, the previously loaded library 1002 has a size of 0x1800 and is stored starting at 0x10000. As a result, a hole 1004 having a size of 0x800 remains unoccupied. Thus, when a new library having a size 0x400 is being loaded, the memory manager determines whether the new library can be stored in the hole 1004. Once it has determined that the size of the new library is less than or equal to that of the hole 1004 and that the attributes of the new library are compatible with that of the memory segment 1000, the new library is stored in the hole 1004 as shown at 1006. More particularly, the starting address of the library is obtained by adding the starting virtual address of the previously loaded library to the size of the previously loaded library. Once the new library is loaded, a new hole 1008 having a size 0x400 remains. Thus, the new library is the owner of the new hole.

Through a secondary memory allocation scheme including a memory manager and associated memory segment list, the present invention enables physical memory as well as virtual memory to be conserved. Although each new memory segment must be equal to one or more pages upon allocation in order to enable mapping between virtual and physical addresses by the TLB in today's virtual memory systems, the subsequent utilization of "holes" to store files allows the size of the memory segments eventually catalogued in the memory segment list to vary with the size of the associated files. For instance, the size of the memory segments may vary according to the type of the files and therefore the requirements of the files that are to be stored in the memory segments. Alternatively, depending upon the size of the files stored in the memory segments, the amount of memory in the memory segments may be identical. Accordingly, a memory segment catalogued in the memory segment list may actually be equal to a fractional number of pages rather than equal to one or more pages. In this manner, the present invention is used to enable a portion of a page to be used within the confines of system requirements requiring that memory be allocated and mapped in units of pages.

The present invention may be implemented on any suitable computer system. Moreover, the present invention may be stored in any suitable memory. For instance, the present invention may be implemented on random access memory (RAM) such as SRAM or DRAM, read only memory (ROM), or other suitable computer readable medium.

Although illustrative embodiments and applications of this invention are shown and described herein, many variations and modifications are possible which remain within the concept, scope, and spirit of the invention, and these variations would become clear to those of ordinary skill in the art after perusal of this application. As one example, although the described embodiment compares the hole size and attributes of a file, other embodiments may compare only the hole size or may compare attributes other than those listed. As yet another example, although the specification has described a specific embodiment of a memory segment list, other methods and data structures for managing the allocation of memory segments and "holes" associated with these memory segments can be used as well. In addition, the entries in the memory segment list may be sorted according to virtual address or other suitable criteria. Moreover, although the present invention is described as being applied during the execution of an application, it is equally applicable to the allocation of memory for other purposes. Accordingly, the present embodiments are to be considered as illustrative and not restrictive, and the invention is not to be limited to the details given herein, but may be modified within the scope and equivalents of the appended claims.

What is claimed is:

1. In a virtual memory system, a method of loading at least a portion of a DLL into virtual memory when at least a portion of the DLL is called by a running application, comprising:

maintaining a set of memory segments using a memory segment list, each one of the set of memory segments having one or more associated attributes;

determining from the memory segment list whether at least a portion of a DLL having one or more associated attributes can be stored in an unoccupied portion of one of the set of memory segments, the memory segment list including one or more entries, each of the one or more entries being associated with one of the set of memory segments and being adapted for identifying a size of an unoccupied portion within the memory segment;

if it is determined that the at least a portion of the DLL can be stored in an unoccupied portion of one of the set of memory segments, dividing the one of the set of memory segments such that the one of the set of memory segments includes an occupied portion of the one of the set of memory segments and a new memory segment includes the unoccupied portion of the one of the set of memory segments, storing the portion of the DLL in the new memory segment, associating a virtual address in the virtual memory with the portion of the DLL, and updating the memory segment list to include the virtual address associated with the portion of the DLL; and if it is determined that the portion of the DLL cannot be stored in an unoccupied portion of one of the memory segments, allocating a new memory segment including one or more pages, storing the portion of the DLL in the new memory segment, associating a virtual address in the virtual memory with the portion of the DLL, and updating the memory segment list to include the virtual address associated with the portion of the DLL.

2. A method of allocating memory for a DLL in a virtual memory system when one or more files in the DLL are called by a running application, comprising:

allocating a memory segment including one or more pages, the memory segment having one or more associated attributes;

storing a first file of the DLL in the memory segment;

associating a virtual address in virtual memory with the first file of the DLL;

identifying from a memory segment list whether the memory segment contains an unoccupied portion that is large enough to store a second file of the DLL having one or more associated attributes, each entry in the memory segment list being adapted for identifying a starting virtual address of a memory segment, indicating a size of an unoccupied portion within the memory segment and indicating a size of an occupied portion within the memory segment; and ascertaining whether the attributes of the second file of the DLL are compatible with the attributes of the memory segment.

3. The method as recited in claim 2, further comprising:

storing the second file of the DLL in the unoccupied portion if the unoccupied portion is large enough to store the second file of the DLL and if the attributes of the second file of the DLL are compatible with the attributes of the memory segment; and allocating a new memory segment including one or more pages if at least one of the unoccupied portion is not large enough to store the second file of the DLL and the attributes of the second file of the DLL are not compatible with the attributes of the memory segment.

4. The method as recited in claim 2, wherein each of the one or more pages is associated with an entry in a translation look-aside buffer.

5. The method as recited in claim 2, further comprising:

maintaining a memory segment list including a plurality of entries, each one of the plurality of entries being associated with a memory segment that is allocated.

6. The method as recited in claim 2, further comprising:

maintaining a memory segment list including a plurality of entries, each one of the plurality of entries being associated with a file of the DLL that is stored in an associated memory segment.

7. A method of allocating memory for a file of a DLL in a virtual memory system when the file is called by a running application, the method comprising:

determining a size of the file in the DLL; and searching a memory segment list to determine whether the file in the DLL can be stored in one of a plurality of memory segments catalogued in the memory segment list, the memory segment list having a plurality of entries, each one of the plurality of entries being associated with one of the plurality of memory segments, each corresponding one of the plurality of entries being adapted for identifying a virtual address associated with one of the plurality of memory segments and being adapted for indicating a hole size associated with a hole that indicates and amount of memory within the one of the plurality of memory segments that is unoccupied and being adapted for indicating an amount of memory within the one of the plurality of memory segments that is occupied by at least a portion of one or more DLLs.

8. The method as recited in claim 7, wherein searching the memory segment list further comprises:

ascertaining whether a memory segment associated with one of the plurality of entries in the memory segment list is identified to have a hole size at least as large as the size of the file of the DLL.

9. The method as recited in claim 8, further comprising:

if one of the plurality of entries in the memory segment list is identified to have a hole size at least as large as the size of the file of the DLL, creating a new entry in the memory segment list including an address of the hole in the identified memory segment and a hole size equal to the hole size of the identified memory segment less the size of the file of the DLL, storing the file of the DLL in the hole, associating the new entry with the file of the DLL, an setting the hole size of the one of the plurality of entries associated with the identified memory segment to zero.

10. The method as recited in claim 9, wherein associating the new entry with the file comprises:
    storing a file identifier associated with the file of the DLL in the new entry; and
    storing a size identifier indicating the size of the file of the DLL in the new entry.

11. The method as recited in claim 8, further comprising:
    if one of the plurality of entries in the memory segment list does not have a hole size at least as large as the size of the file of the DLL, allocating a new memory segment, storing the file of the DLL in the new memory segment, creating a new entry in the memory segment list including an address of the new memory segment and a hole size equal to a size of the new memory segment less the size of the file of the DLL, and associating the new entry with the file of the DLL.

12. The method as recited in claim 11, wherein the size of the new memory segment is equal to one or more pages.

13. The method as recited in claim 12, wherein the amount of memory represented by the plurality of entries in the memory segment list is equal to one or more pages.

14. The method as recited in claim 11, wherein associating the new entry with the file of the DLL comprises:
    storing a file identifier associated with the file of the DLL in the new entry; and
    storing a size identifier indicating the size of the file of the DLL in the new entry.

15. The method as recited in claim 7, wherein the amount of memory in each one of the plurality of memory segments varies with the size of the associated file of the DLL.

16. The method as recited in claim 7, wherein the amount of memory in each one of the plurality of memory segments is identical.

17. The method as recited in claim 16, wherein the amount of memory in one or more of the plurality of memory segments is equal to a fractional number of pages.

18. The method as recited in claim 7, wherein the plurality of memory segments are sized according to requirements of the files of the DLLs that are to be stored in the memory segments.

19. A method of allocating memory for a segment of a DLL in a virtual memory system when the segment of the DLL is called by a running application, the method comprising:
    determining a size of the segment of the DLL;
    ascertaining attributes of the segment of the DLL; and
    searching a memory segment list to determine whether the segment of the DLL can be stored in one of a plurality of memory segments catalogued in the memory segment list, the memory segment list having a plurality of entries, each one of the plurality of entries being associated with one of the plurality of memory segments and identifying one or more attributes of the associated memory segment, each one of the plurality of entries being adapted for identifying a virtual address in virtual memory that is associated with one of the plurality of memory segments and being adapted for identifying a hole size associated with a hole that identifies an amount of memory within the memory segment that is unoccupied and being adapted for indicating an amount of memory within the memory segment that is occupied by at least a portion of one or more DLLs.

20. The method as recited in claim 19, wherein searching the memory segment list to determine whether the segment of the DLL can be stored in one of the plurality of segments catalogued in the memory segment list comprises:
    comparing the size of the segment of the DLL with the hole size identified in the plurality of entries in the memory segment list; and
    comparing the attributes of the segment of the DLL with the one or more attributes identified in the plurality of entries in the memory segment list.

21. The method as recited in claim 20, further comprising:
    if one of the plurality of entries in the memory segment list is determined to identify a hole size at least as large as the size of the segment of the DLL and the attributes are identified to be compatible with the attributes of the segment of the DLL, storing the segment of the DLL in the hole and updating the memory segment list to reflect that the segment of the DLL has been stored in the hole; and
    if one of the plurality of entries in the memory segment list having a hole size at least as large as the size of the segment of the DLL and attributes compatible with the attributes of the segment of the DLL cannot be identified, allocating a new memory segment, storing the segment of the DLL in the new memory segment and updating the memory segment list to reflect that the segment of the DLL has been stored in the new memory segment.

22. A system for storing a DLL in an associated virtual memory, the system comprising:
    a processor; and
    a memory, at least one of the processor and the memory being adapted for storing therein the following:
        a memory segment list including a plurality of entries, each one of the plurality of entries being adapted for being associated with one of a plurality of memory segments, each one of the plurality of entries being adapted for identifying a virtual address in virtual memory that is associated with the one of the plurality of memory segments and being adapted for identifying a-hole in the one of the plurality of memory segments, indicating a hole size associated with the hole that identifies an amount of memory within the one of the plurality of memory segments that is unoccupied by one or more DLL segments, and indicating an amount of memory within the one of the plurality of memory segments that is occupied by one or more DLL segments; and
        a module for storing one or more DLL segments in one or more of the plurality of memory segments and categorizing the one or more DLL segments in one or more of the plurality of entries in the memory segment list when the one or more DLL segments are called by a running application.

23. The system as recited in claim 22, wherein each one of the plurality of entries further identifies one or more attributes associated with the corresponding memory segment.

24. The method as recited in claim 22, wherein the hole size associated with each one of the plurality of memory segments is a zero or non-zero value.

25. A system for storing a DLL in an associated virtual memory, the system comprising:
    a processor; and
    a memory having stored therein the following:
        a memory manager configured to update a memory segment list such that it includes a plurality of entries, each one of the plurality of entries being associated with one of a plurality of memory segments and being capable of identifying a virtual address in the virtual memory that is associated with the one of the plurality of memory segments such that at least a portion of the DLL is associated with the virtual address in the virtual memory, a hole in the associated one of the plurality of memory segments and a hole size associated with the hole that identifies a portion of memory within the memory segment that is unoccupied, and an amount of memory within the memory segment that is occupied by at least a portion of one or more DLLs.

26. The system as recited in claim 25, wherein the memory manager is further configured to update the memory, segment list such that each one of the plurality of entries identifies one or more attributes associated with the associated one of the plurality of memory segments.

27. The system as recited in claim 26, wherein the one or more attributes include a capability to at least one of read, write, and execute.

28. The system as recited in claim 26, wherein the one or more attributes indicate that the contents of the associated memory segment are to be cached according to a specified caching policy.

29. The system as recited in claim 25, wherein the memory manager is further adapted for examining the memory segment list to identify a hole suitable for storing at least a portion of the DLL.

30. The system as recited in claim 25, wherein the memory is RAM or ROM.

31. A system for storing a DLL in an associated virtual memory, the system comprising:
  a processor;
  a physical memory having an associated physical address range;
  a virtual memory having an associated virtual address range;
  a memory manager configured to update a memory segment list such that it includes a plurality of entries, each one of the plurality of entries being associated with one of a plurality of memory segments and being identified by a virtual address in the virtual address range, the virtual address corresponding to a physical address associated with at least a portion of a DLL each one of the plurality of entries being capable of identifying a hole size associated with a hole in the associated memory segment that identifies an amount of memory within the memory segment that is unoccupied by one or more DLL segments; and
  a module for storing one or more segments of the DLL in one or more of the plurality of memory segments and categorizing the one or more segments of the DLL in one or more of the plurality of entries in the memory segment list when the one or more segments of the DLL are called by a running application.

32. The system as recited in claim 31, wherein the memory manager is further configured to determine a size of the DLL and allocate a new memory segment from the physical memory when the DLL does not fit in a hole associated with one of the plurality of memory segments.

33. The system as recited in claim 32, wherein the memory manager is further configured to update the memory segment list to include the new memory segment.

34. The system as recited in claim 31, wherein the memory manager is further configured to determine a size of the DLL and store the DLL in a hole in one of the plurality of memory segments when the hole is determined to be at least as large as the size of the DLL.

35. The system as recited in claim 34, wherein the memory manager is further configured to update the memory segment list to associate the DLL with the hole.

36. The system as recited in claim 31, wherein each one of the plurality of entries identifies one or more attributes associated with the associated one of the plurality of memory segments.

37. The system as recited in claim 36, wherein the memory manager is further configured to determine a size of a file of the DLL, determine one or more attributes of the file of the DLL, and allocate a new memory segment from the physical memory when the file of the DLL does not fit in a hole associated with one of the plurality of memory segments having one or more attributes compatible with the attributes of the file of the DLL.

38. The system as recited in claim 37, wherein the memory manager is further configured to update the memory segment list to include the new memory segment.

39. The system as recited in claim 36, wherein the memory manager is further configured to determine a size of a file of the DLL and one or more attributes of the file of the DLL, and store the file of the DLL in a hole in one of the plurality of memory segments when the hole is determined to be at least as large as the size of the file of the DLL when the associated memory segment is determined to have one or more attributes that are compatible with the attributes of the file of the DLL.

40. The system as recited in claim 39, wherein the memory manager is further configured to update the memory segment list to associate the file of the DLL with the hole.

41. The system as recited in claim 31, wherein the physical memory is RAM or ROM.

42. A computer program product for causing a processor to allocate memory for a DLL in a virtual memory system when a file of the DLL is called by a running application, comprising:
  a computer readable medium storing computer readable instructions thereon, the computer readable instructions including:
    instructions for maintaining a set of memory segments using a memory segment list, each one of the set of memory segments having one or more associated attributes;
    instructions for determining from the memory segment list whether a file of the DLL having one or more associated attributes can be stored in an unoccupied portion of one of the set of memory segments, the memory segment list including one or more entries, each of the one or more entries being associated with one of the set of memory segments and being adapted for identifying a size of an unoccupied portion within the memory segment;
    instructions for if it is determined that the file of the DLL can be stored in an unoccupied portion of one of the set of memory segments, dividing the one of the set of memory segments such that the one of the set of memory segments includes an occupied portion of the one of the set of memory segments and a new memory segment includes the unoccupied portion of the one of the set of memory segments, and storing the file of the DLL in the new memory segment;
    instructions for if it is determined that the file of the DLL cannot be stored in an unoccupied portion of one of the memory segments, allocating a new memory segment including one or more pages and storing the file of the DLL in the new memory segment;

instructions for associating a virtual address in the virtual memory with the file of the DLL; and instructions for updating the memory segment list to include the new memory segment in the set of memory segments such that the virtual address associated with the file of the DLL is stored in the memory segment list.

43. A computer program product storing thereon computer readable instructions for causing a processor to allocate memory for a DLL in a virtual memory system when one or more files of the DLL are called by a running application, comprising:

a computer readable medium storing computer readable instructions thereon, the computer readable instructions including:

instructions for allocating a memory segment including one or more pages, the memory segment having one or more associated attributes;

instructions for storing a first file of the DLL in the memory segment;

instructions for identifying from a memory segment list whether the memory segment contains an unoccupied portion that is large enough to store a second file of the DLL having one or more associated attributes, each entry in the memory segment list being adapted for identifying a starting virtual address of a memory segment, indicating a size of an unoccupied portion within the memory segment and indicating a size of an occupied portion within the memory segment; and instructions for ascertaining whether the attributes of the second file of the DLL are compatible with the attributes of the memory segment.

44. A computer program product for causing a processor to allocate memory for a file of a DLL in a virtual memory system when the file is called by a running application, comprising:

a computer readable medium storing computer readable instructions thereon, the computer readable instructions including:

instructions for determining a size of a file of the DLL; and instructions for searching a memory segment list to determine whether the file of the DLL can be stored in one of a plurality of memory segments catalogued in the memory segment list, the memory segment list having a plurality of entries, each one of the plurality of entries being associated with one of the plurality of memory segments, each corresponding one of the plurality of entries being adapted for identifying a virtual address associated with the one of the plurality of memory segments, being adapted for indicating a hole size associated with a hole that indicates an amount of memory within the one of the plurality of memory segments that is unoccupied and being adapted for indicating an amount of memory within the one of the plurality of memory segments that is occupied by at least a portion of one or more DLLs.

45. A computer program product for causing a processor to allocate memory for a DLL in a virtual memory system when at least a portion of the DLL is called by a running application, comprising:

a computer readable medium storing computer readable instructions thereon, the computer readable instructions including:

instructions for determining a size of a file of the DLL;

instructions for ascertaining attributes of the file of the DLL; and instructions for searching a memory segment list to determine whether the file of the DLL can be stored in one of a plurality of memory segments catalogued in the memory segment list, the memory segment list having a plurality of entries, each one of the plurality of entries being associated with one of the plurality of memory segments and identifying one or more attributes of the associated memory segment, each one of the plurality of entries being adapted for identifying a virtual address associated with one of the plurality of memory segments, being adapted for identifying a hole size associated with a hole that identifies an amount of memory within the one of the plurality of memory segments that is unoccupied and being adapted for indicating an amount of memory within the one of the plurality of memory segments that is occupied by at least a portion of one or more DLLs.

* * * * *